US012617300B2

(12) United States Patent
Taskas et al.

(10) Patent No.: US 12,617,300 B2
(45) Date of Patent: May 5, 2026

(54) INTEGRATED VEHICLE POWER CONVERTER AND BATTERY CHARGER

(71) Applicant: Ford Global Technologies, LLC, Dearborn, MI (US)

(72) Inventors: Petros G. Taskas, Novi, MI (US); Baoming Ge, Okemos, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 86 days.

(21) Appl. No.: 18/310,696

(22) Filed: May 2, 2023

(65) Prior Publication Data

US 2024/0367529 A1     Nov. 7, 2024

(51) Int. Cl.
B60L 53/10         (2019.01)
B60L 53/22         (2019.01)
B60L 53/24         (2019.01)
H02M 1/10          (2006.01)

(52) U.S. Cl.
CPC ............... B60L 53/11 (2019.02); B60L 53/22 (2019.02); B60L 53/24 (2019.02); *B60L 2210/14* (2013.01); *H02M 1/10* (2013.01)

(58) Field of Classification Search
CPC ...... B60L 53/11; B60L 53/20–24; H02M 1/10
See application file for complete search history.

(56) References Cited

U.S. PATENT DOCUMENTS 10,189,357 B2     1/2019  Zou et al.
10,369,900 B1 *   8/2019  Conlon ................... B60L 53/14

| 2016/0243953 | A1* | 8/2016 | Spesser | B60L 53/14 |
|---|---|---|---|---|
| 2020/0298722 | A1* | 9/2020 | Smolenaers | H02J 7/345 |
| 2021/0044135 | A1* | 2/2021 | Lee | H02J 7/1492 |
| 2021/0101494 | A1* | 4/2021 | Lee | H02M 7/23 |
| 2021/0399560 | A1* | 12/2021 | Lee | H02J 7/0047 |
| 2022/0032798 | A1* | 2/2022 | Haussmann | B60L 53/11 |
| 2022/0274496 | A1* | 9/2022 | Gannamaneni | B60L 53/50 |
| 2022/0344962 | A1* | 10/2022 | Xu | B60L 53/22 |
| 2023/0087317 | A1* | 3/2023 | Kim | G01R 19/10 |
| | | | | 701/31.7 |
| 2023/0150375 | A1* | 5/2023 | Watanabe | B60L 50/51 |
| | | | | 318/139 |
| 2023/0365016 | A1* | 11/2023 | Prasad | H02M 3/1586 |
| 2023/0378797 | A1* | 11/2023 | Hao | H02M 5/12 |

(Continued)

FOREIGN PATENT DOCUMENTS

DE     102016206945 A1 * 10/2017   .............. B60L 53/22
DE     102019005381 A1 *  4/2020

(Continued)

OTHER PUBLICATIONS

English machine translation of DE102016206945A1, published Oct. 26, 2017 (Year: 2017).*

*Primary Examiner* — Rexford N Barnie
*Assistant Examiner* — David A Shiao
(74) *Attorney, Agent, or Firm* — David B. Kelley; Brooks Kushman P.C.

(57)     ABSTRACT

Responsive to a voltage across a capacitor being greater than a voltage across a traction battery, a controller may open switches such that charge current from a DC charger flows through a diode to the traction battery without following through coils of an electric machine and without flowing through an inverter.

17 Claims, 2 Drawing Sheets

(56)                        References Cited

U.S. PATENT DOCUMENTS

| | | | |
|---|---|---|---|
| 2023/0398888 A1* | 12/2023 | Ranjbar | ................. H02M 1/10 |
| 2024/0100982 A1* | 3/2024 | Aspacher | ............. H02M 1/007 |
| 2024/0140225 A1* | 5/2024 | Pfeilschifter | ............ B60L 3/04 |
| 2024/0208332 A1* | 6/2024 | Boehme | ................. H02M 1/10 |
| 2024/0253490 A1* | 8/2024 | Berger | ................... B60L 53/20 |
| 2025/0033508 A1* | 1/2025 | Pfeilschifter | ........... B60L 53/11 |
| 2025/0108698 A1* | 4/2025 | Haussmann | ............ B60L 53/24 |

FOREIGN PATENT DOCUMENTS

| | | | |
|---|---|---|---|
| EP | 3183795 | B1 | 12/2018 |
| JP | 4285458 | B2 | 6/2009 |

* cited by examiner

INTEGRATED VEHICLE POWER CONVERTER AND BATTERY CHARGER

TECHNICAL FIELD

This disclosure relates to automotive power systems.

BACKGROUND

A vehicle may include an energy storage device, such as a traction battery, that provides power to an electric machine to propel the vehicle. This traction battery may be charged from an AC grid or DC fast charger.

SUMMARY

A vehicle includes a traction battery, an electric machine, an inverter electrically between then traction battery and electric machine, input circuitry including a capacitor, a diode, and a pair of series connected switches, and one or more controllers. The one or more controllers, responsive to a voltage across the capacitor being greater than a voltage across the traction battery, open the switches such that charge current from a DC charger electrically connected with the input circuitry flows through the diode to the traction battery without following through coils of the electric machine and without flowing through the inverter.

A method includes, responsive to indication a DC charger is electrically connected with a vehicle, and a voltage across a capacitor of the vehicle electrically in parallel with the DC charger is greater than a voltage across a traction battery of the vehicle, opening a pair of switches of the vehicle such that charge current from the DC charger flows through a diode of the vehicle to the traction battery without flowing through coils of an electric machine of the vehicle or an inverter of the vehicle. The method further includes, responsive to the indication, and the voltage across the capacitor is less than the voltage across the traction battery, opening one of the switches and closing the other of the switches such that charge current from the DC charger flows through the coils and the inverter to the traction battery.

An automotive power system includes one or more controllers that, responsive to indication a DC charger is connected and a voltage across a capacitor is less than a voltage across a traction battery, open one of a pair of series connected switches and close another of the switches such that charge current from the DC charger flows through coils of an electric machine and an inverter to the traction battery, and responsive to indication an AC charger is activated, close the switches such that charge current from the AC charger flows through the coils and inverter to the traction battery.

DETAILED DESCRIPTION

Embodiments are described herein. It is to be understood, however, that the disclosed embodiments are merely examples and other embodiments may take various and alternative forms. The figures are not necessarily to scale. Some features could be exaggerated or minimized to show details of particular components. Therefore, specific structural and functional details disclosed herein are not to be interpreted as limiting, but merely as a representative basis for teaching one skilled in the art.

Various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

400V and 800V DC fast chargers are two types of charging systems that can be used for charging battery electric vehicles (BEVs). A 400V DC fast charger typically delivers a voltage range of 200V-500V and a current range of up to 500 A. This can provide a charge rate of up to 80% of a BEV's battery capacity in as little as 30 minutes, depending on the vehicle and the charger. 400V DC fast chargers are commonly found in public charging stations and can be used to charge most BEVs currently on the market.

800V DC fast chargers can deliver up to 800V and 400 A, allowing it to provide a higher charge rate than 400V DC fast chargers. This can result in faster charging times, typically allowing for an 80% charge in 15-20 minutes. 800V charging systems, however, are currently less common than 400V charging systems.

BEVs with an 800V DC bus and an 800V traction battery are becoming more common. These systems will require an 800V DC fast charger.

Figure 1:
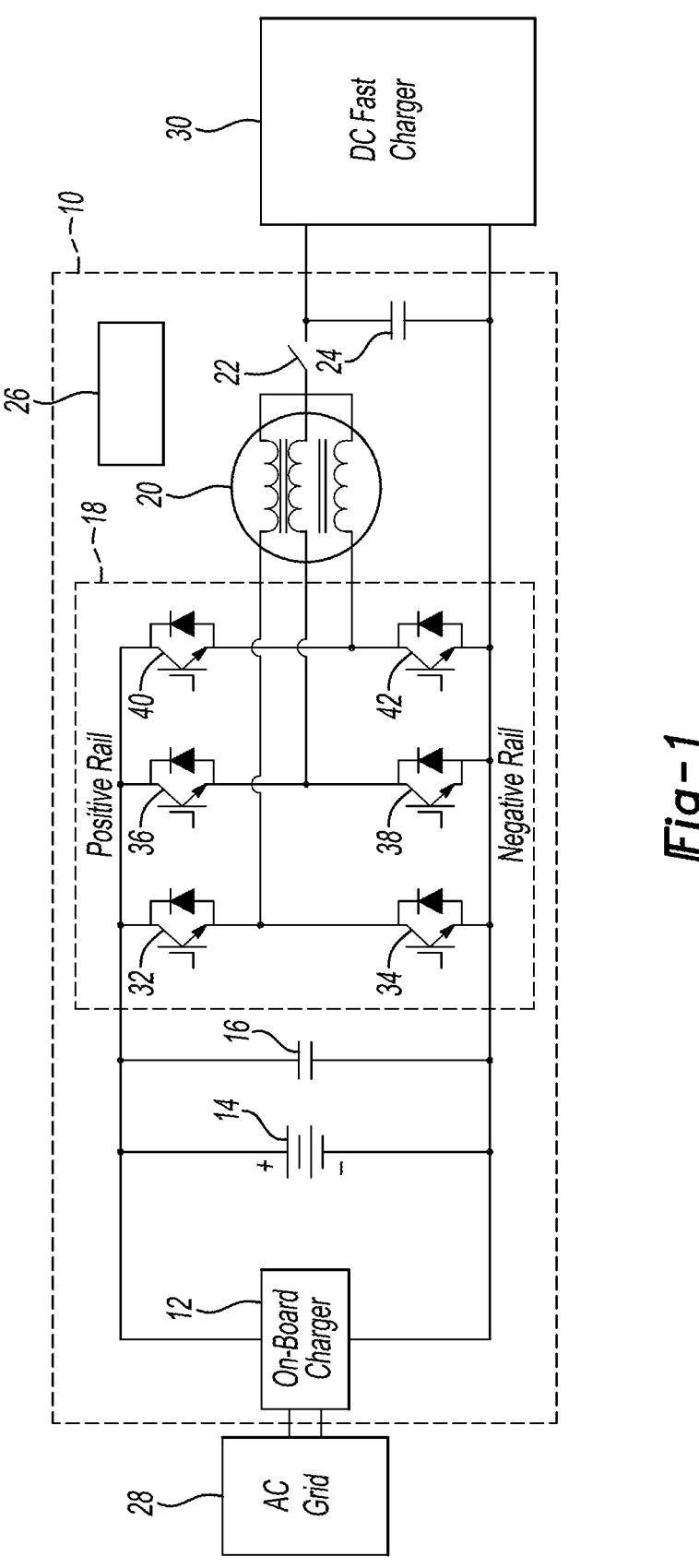
FIG. 1 is a schematic diagram of a vehicle.

Referring to FIG. 1, a vehicle 10 includes an on-board charger 12, a traction battery 14 (e.g., an 800V battery), a DC link capacitor 16, an inverter 18, an electric machine 20, a switch 22, and a capacitor 24, and one or more controllers 26. The on-board charger 12 is connectable with an AC grid 28 as known in the art. The traction battery 14 is electrically connected in parallel between the on-board charger 12 and DC link capacitor 16. The DC link capacitor 16 is electrically connected in parallel between the traction battery 14 and inverter 18. The inverter 18 is electrically connected between the DC link capacitor 16 and electric machine 20. The electric machine 20 is electrically connected between the inverter 18 and switch 22. The switch 22 is configured to connect coils of the electric machine 20 with a terminal of the capacitor 24. And the capacitor 24 is connectable with a DC fast charger 30 such that when connected, the capacitor 24 is electrically connected in parallel with the DC fast charger 30. The on-board charger 12, traction battery 14, inverter 18, electric machine 20, and switch 22 are in communication with/under the control of the one or more controllers 26.

The inverter 18 includes a plurality of field effect transistors 32, 34, 36, 38, 40, 42. The field effect transistors 32, 34 are electrically connected in series, and form a first phase leg of the inverter 18. The field effect transistors 36, 38 are electrically connected in series, and form a second phase leg of the inverter 18. And the field effect transistors 40, 42 are electrically connected in series, and form a third phase leg of the inverter 18. The first, second, and third phase legs are electrically connected in parallel, and each is electrically connected with one of the coils of the electric machine 20.

The inverter 18 is a bidirectional inverter in that it can convert direct current (DC) electricity to alternating current (AC) and vice versa. The field effect transistors 32, 34, 36, 38, 40, 42 control the flow of current through the inverter 18. When the inverter 18 is operating in a DC to AC mode, the field effect transistors 32, 34, 36, 38, 40, 42 are activated so as to allow the DC input voltage to be switched rapidly to create an AC waveform. Conversely, when the inverter 18 is operating in an AC to DC mode, the field effect transistors 32, 34, 36, 38, 40, 42 are activated to rectify the AC input voltage into a DC output voltage. As mentioned above, the field effect transistors 32, 34, 36, 38, 40, 42 are controlled by the one or more controllers 26 that monitor the input and output voltages and adjust the switching frequency and duty cycle to maintain the desired output voltage and power level.

Because the inverter 18 can switch between the DC to AC and AC to DC modes on-the-fly, it can function as a charger for the traction battery 14, as well as a power source for AC loads such as the electric machine 20. The vehicle 10 thus has a boost converter system that includes the coils of the electric machine 20 and the inverter 18. When the DC fast charger (400V) is connected in parallel with the capacitor 24, the one or more controllers 26 can operate the inverter 18 in voltage boost mode to charge the traction battery 14.

There may be a few ways to incorporate an 800V DC Fast Charger. One way may be to build an additional connector interfaced with the traction battery 14. The second way may be to connect the 800V DC fast charger to the capacitor 24, and the inverter 18 would work in passthrough mode to directly charge the traction battery 14. The former may require additional complexity and packaging space. The latter may lower the charging efficiency because of additional power loss from the 18 inverter and coils of the electric machine 20.

The on-board charger 12 being directly connected to the traction battery 14 may introduce challenges for component selection of the on-board charger 12. If the on-board charger 12 is rated for a 400V system, power device ratings would likely be 600V/650V. To achieve an 800V on-board charger, 1200V metal-oxide-semiconductor field-effect transistors may be needed, which may increase power loss in comparison with the 400V system.

Figure 2:
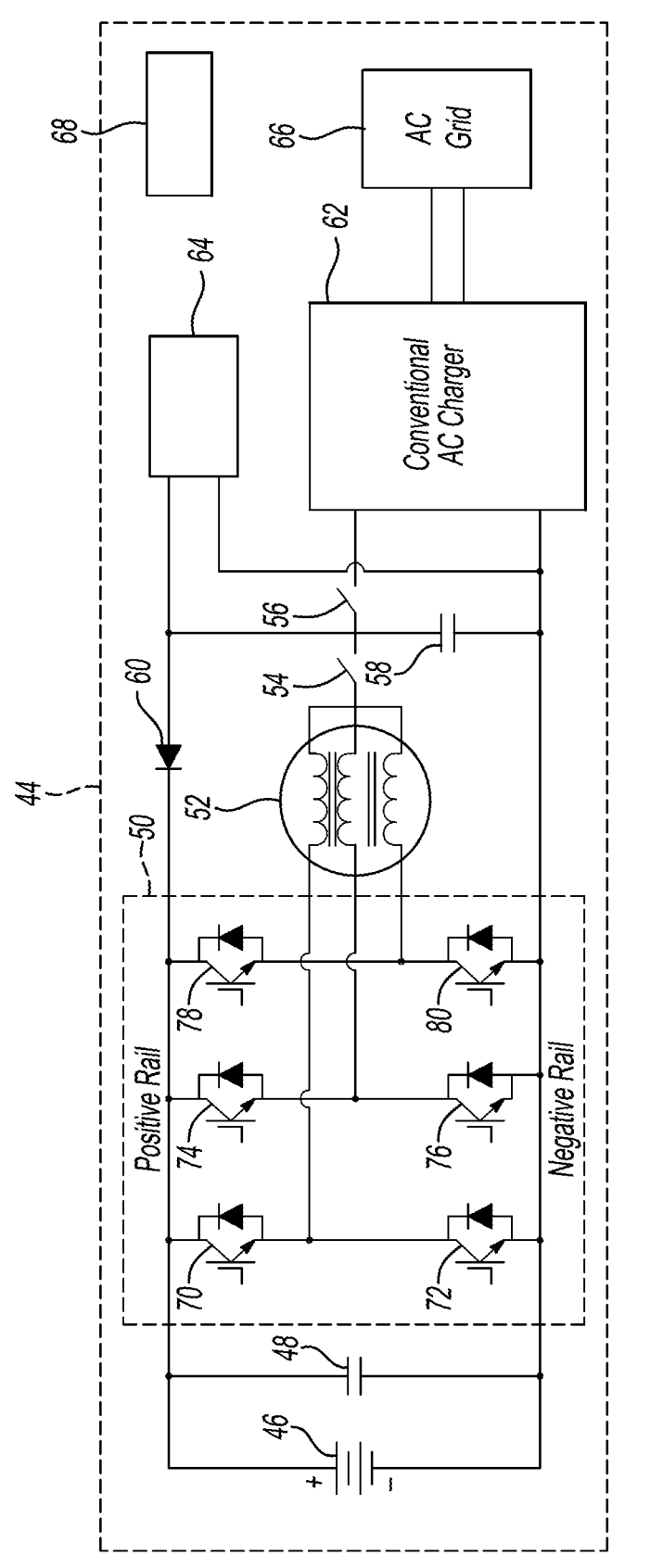
FIG. 2 is schematic diagram of another vehicle.

Here, a compact and integrated 800V battery charger converter is proposed. Referring to FIG. 2, a vehicle 44 includes a traction battery 46 (e.g., an 800V battery), a DC link capacitor 48, an inverter 50 (bidirectional inverter), an electric machine 52, switches 54, 56, a capacitor 58, a diode 60, an AC charger 62, a connector 64 for a 400V or 800V DC fast charger (the same connector is used for a 400V DC fast charger or an 800V DC fast charger), a connector 66 for an AC grid, and one or more controllers 68. The DC link capacitor 48 is electrically connected in parallel between the traction battery 46 and inverter 50. The inverter 50 is electrically connected between the DC link capacitor 48 and the electric machine 52. The electric machine 52 is electrically connected between the inverter 50 and switch 54. The switches 54, 56 are electrically connected in series, with the switch 54 being electrically connected between coils of the electric machine 52 and the switch 56. The capacitor 58 is electrically connected between a shared terminal of the switches 54, 56 and a negative rail of the inverter 50. The diode 60 is electrically connected between the shared terminal of the switches 54, 56 (anode of diode 60) and a positive rail of the inverter 50 (cathode of diode 60). The AC charger 62 is electrically connected such that when the switch 56 is closed, the AC charger 62 is electrically connected in parallel with the capacitor 58. The connector 64 is electrically connected in parallel with the capacitor 58 such that the shared terminal of the switches 54, 56, the anode of the diode 60, and a line of the connector 64 share a node. And the connector 66 is electrically connected with the AC charger 62. The traction battery 46, inverter 50, electric machine 52, switches 54, 56, AC charger 62, and connector 64, 66 are in communication with/under the control of the one or more controllers 68.

The inverter 50 includes a plurality of field effect transistors 70, 72, 74, 76, 78, 80. The field effect transistors 70, 72 are electrically connected in series, and form a first phase leg of the inverter 50. The field effect transistors 74, 76 are electrically connected in series, and form a second phase leg of the inverter 50. And the field effect transistors 78, 80 are electrically connected in series, and form a third phase leg of the inverter 50. The first, second, and third phase legs are electrically connected in parallel, and each is electrically connected with one of the coils of the electric machine 52.

To facilitate charging of the traction battery 46, the one or more controller 68 may monitor, using known sensing technologies such as sensors, etc., voltages across the traction battery 46 and capacitor 58, and signals (referred to as x1 and x2 respectively) from the AC charger 62 and any DC fast charger connected with the connector 64.

If x1 shows the AC charger 62 is activated and x2 shows a DC fast charger is not connected, close the switches 54, 56. When the AC charger 62 is working, the charging power goes through coils of the electric machine 52 and the inverter 50 (working in boost mode) to the traction battery 46. The 400V output voltage of the AC charger 62 is boosted to 800V to charge the traction battery 46.

If x1 shows the AC charger 62 is deactivated, x2 shows a DC fast charger is connected with the connector 64, and the voltage across the capacitor 58 is greater than the voltage across the traction battery 46, open the switches 54, 56. The DC fast charger charges the traction battery 46 through the diode 60. The electric machine 20 is turned off and there is no power flowing through electric machine 52 or inverter 50. This will achieve high efficiency battery charging, and reduce thermal stress on power devices of the inverter 50 and electric machine 52.

If x1 shows the AC charger 62 deactivated, x2 shows a DC fast charger is connected with the connector 64, and the voltage across the capacitor 58 is less than the voltage across the traction battery 46, close the switch 54 and open switch 56. The DC fast charger delivers power through the coils of the electric machine 52 and inverter 50 (working in boost mode) to the traction battery 46. The DC fast charger voltage is boosted to charge the traction battery 46.

Thus, if the DC fast charger voltage is greater than the battery voltage, charging power goes through the diode 60 only and the electric machine 52 is OFF. This may be efficient because there is no current flowing (and no losses) through the coils of the electric machine 52 or inverter 50. This arrangement further utilizes the inverter 50 and coils of the electric machine 52 to achieve 400V DC fast charging and AC on-board charging (via the AC charger 62) for the traction battery 46. For an 800V DC fast charger, the diode 60 is used to directly charge the traction battery 46.

The algorithms, methods, or processes disclosed herein can be deliverable to or implemented by a computer, controller, or processing device, which can include any dedicated electronic control unit or programmable electronic control unit. Similarly, the algorithms, methods, or processes can be stored as data and instructions executable by a computer or controller in many forms including, but not limited to, information permanently stored on non-writable storage media such as read only memory devices and information alterably stored on writeable storage media such as compact discs, random access memory devices, or other magnetic and optical media. The algorithms, methods, or processes can also be implemented in software executable objects. Alternatively, the algorithms, methods, or processes can be embodied in whole or in part using suitable hardware components, such as application specific integrated circuits, field-programmable gate arrays, state machines, or other hardware components or devices, or a combination of firmware, hardware, and software components.

While exemplary embodiments are described above, it is not intended that these embodiments describe all possible forms encompassed by the claims. The words used in the specification are words of description rather than limitation, and it is understood that various changes may be made without departing from the spirit and scope of these disclosed materials. The terms "controller" and "controllers," for example, can be used interchangeably herein.

As previously described, the features of various embodiments may be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. These attributes may include, but are not limited to strength, durability, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and may be desirable for particular applications.

What is claimed is:

1. A vehicle comprising:
a traction battery;
an electric machine;
a bidirectional boost inverter electrically between the traction battery and electric machine;
input circuitry including a capacitor, a diode, and a pair of series connected switches, wherein the pair of switches are connected between an AC charger and the bidirectional boost inverter; and
one or more controllers programmed to, responsive to a voltage across the capacitor being greater than a voltage across the traction battery, open the pair of switches such that charge current from a DC charger electrically connected with the input circuitry flows through the diode to the traction battery without following through coils of the electric machine and without flowing through the inverter.

2. The vehicle of claim 1, wherein the one or more controllers are further programmed to, responsive to the voltage across the capacitor being less than the voltage across the traction battery, open one of the pair of switches and close the other of the pair of switches such that charge current from the DC charger electrically connected with the input circuitry flows through the coils and the inverter to the traction battery.

3. The vehicle of claim 1 further comprising the AC charger.

4. The vehicle of claim 3, wherein the one or more controllers are further programmed to, responsive to indication the AC charger is activated, close the pair of switches such that charge current from the AC charger flows through the coils and the inverter to the traction battery.

5. The vehicle of claim 1, wherein the input circuitry further includes a connector for the DC charger and a connector for the AC charger.

6. The vehicle of claim 1, wherein the capacitor, an anode of the diode, and the pair of switches share a common node.

7. The vehicle of claim 1, wherein one of the pair of switches is directly electrically connected with the coils.

8. The vehicle of claim 1, wherein the capacitor is electrically in parallel with the DC charger.

9. A method comprising:
responsive to an indication a DC charger is electrically connected with a vehicle, and a voltage across a capacitor of the vehicle, electrically in parallel with the DC charger and connected at a common node between a pair of series connected switches of the vehicle, is greater than a voltage across a traction battery of the vehicle, opening the pair of switches such that charge current from the DC charger flows through a diode of the vehicle to the traction battery without flowing through coils of an electric machine of the vehicle and a bidirectional boost inverter of the vehicle; and
responsive to the indication and the voltage across the capacitor being less than the voltage across the traction battery, opening one of the pair of switches and closing the other of the pair of switches such that charge current from the DC charger flows through the coils and the inverter to the traction battery.

10. The method of claim 9 further comprising, responsive to the indication and the voltage across the capacitor being less than the voltage across the traction battery, operating the inverter in a boost mode.

11. The method of claim 9 further comprising, responsive to indication an AC charger of the vehicle is activated, closing the pair of switches such that charge current from the AC charger flows through the coils and inverter to the traction battery.

12. The method of claim 11 further comprising operating the inverter in a boost mode.

13. An automotive power system comprising:
one or more controllers programmed to,
responsive to indication a DC charger is connected and a voltage across a capacitor is less than a voltage across a traction battery, open one of a pair of series connected switches and close another of the pair of switches such that charge current from the DC charger flows through coils of an electric machine and a bidirectional boost inverter to the traction battery, and
responsive to indication an AC charger is activated, close the pair of switches such that charge current from the AC charger flows through the coils and inverter to the traction battery.

14. The system of claim 13, wherein the one or more controllers are further programmed to operate the inverter in a boost mode.

15. The system of claim 13, wherein the one or more controllers are further programmed to, responsive to indication a DC charger is connected and the voltage across the capacitor is greater than the voltage across the traction battery, open the pair of switches such that charge current from the DC charger flows through a diode to the traction battery without flowing through the coils and the inverter.

16. The system of claim 15, wherein an anode of the diode is directly electrically connected with the pair of switches.

17. The system of claim 13, wherein one of the pair of switches is directly electrically connected with the coils.

* * * * *